Patented Oct. 10, 1939

2,175,357

UNITED STATES PATENT OFFICE 2,175,357

PREPARATION OF MIXED CELLULOSE ESTERS

Robert W. Maxwell, Wilmington, Del., assignor to E. I. du Pont de Nemours & Company, Wilmington, Del., a corporation of Delaware No Drawing. Application December 15, 1937, Serial No. 179,869

14 Claims. (Cl. 260—226)

This invention relates to the preparation of derivatives of cellulose. More particularly it relates to the preparation of mixed ester derivatives of cellulose, and still more particularly it relates to the preparation of mixed ester derivatives of cellulose which are soluble in organic solvents.

Prior art methods of preparing mixed ester derivatives of cellulose can be grouped in three classifications. Firstly, cellulose may be treated with a mixture of esterifying agents in the presence of an acid catalyst. This gives mixed esters directly. Secondly, cellulose may be first treated with a substituting agent to give a product of intermediate degree of substitution, insoluble in organic solvents, and this product may then be esterified with esterifying agents until a product soluble in organic solvents is obtained. Thirdly, an incompletely substituted cellulose derivative, soluble in organic solvents, may be treated in solution with an esterifying agent to give a mixed ester derivative. According to the prior art, this third method has been carried out in the presence of a catalyst of the group consisting of (1) acid catalysts, such as sulfuric acid, (2) organic bases, such as pyridine or dimethylaniline, and (3) organic caustic alkalis such as sodium hydroxide. However, the process as carried out in the presence of any of these prior art catalysts has distinct disadvantages.

This invention has as an object the preparation of mixed derivatives of cellulose in a simplified manner. A further object is the preparation of mixed cellulose ester derivatives of a low degree of degradation. A still further object is the preparation of mixed ester derivatives of cellulose by a process which produces such mixed esters ready for use directly for the fabrication of shaped materials. Other objects will appear hereinafter.

These objects have been accomplished by the following invention wherein cellulose derivatives, soluble in organic solvents, and containing esterifiable hydroxyl groups, are esterified by dissolving the cellulose derivative in an inert organic solvent and treating it with an esterifying agent in the presence of an alkaline salt of an alkali or alkaline earth metal.

In carrying out the process of the invention, the partially substituted cellulose derivative, such as ethyl cellulose or a hydrolyzed cellulose acetate soluble in organic solvents and containing esterifiable hydroxyl groups, is dissolved in a suitable organic solvent and treated with an esterifying agent for cellulose in intimate contact with an alkaline salt of an alkali metal or of an alkaline earth metal insoluble in the organic solvent. In carrying out the reaction, the solution of cellulose derivative in an organic solvent is mixed with an esterifying agent and with a catalytic amount of an alkaline salt of the above stated group and the mixture is allowed to react at room temperature or at a higher temperature, depending upon the time available and the particular ingredients used. The catalyst is preferably used in finely divided form and the mixture is gently agitated to keep the catalyst in intimate contact with the reactants. Completion of the reaction is easily detected by change in appearance of the catalyst or by a solubility test on a small sample of the mixture. It is characteristic of partially substituted cellulose derivatives that as the degree of substitution is increased, the range of solvents in which the derivative is soluble changes or increases. Accordingly, it is possible to follow the increase in degree of substitution by change in solubility. For example, a cellulose acetate containing about 2.3 acetyl groups per glucose unit is soluble in acetone. As the degree of substitution is increased, the product first becomes soluble in ethyl acetate and then in chloroform.

In many instances, the reaction mixture can be used directly for the preparation of shaped materials, particularly when the quantities of esterifying agent and catalyst are low. One of the special advantages of the procedure is that the catalyst and any reaction product formed by it with the reactants are usually insoluble in the reaction mixture and can hence be filtered out leaving a solution of the new derivative of cellulose which can be used directly for spinning or for the preparation of shaped materials. This is an important advantage of the process and offers a means of effecting substantial savings in cost. However, if it is desired to further purify the product before use, this can be accomplished by precipitation, evaporation, or any of the methods commonly used in the cellulose ester art.

In order that the invention may be more fully understood, the following specific examples are given. These examples are merely by way of illustration and the invention is not limited thereto as will become more fully apparent hereinafter.

EXAMPLE I

*Cellulose acetate methacrylate*

Ten parts of a hydrolyzed, acetone-soluble cellulose acetate containing 2.4 acetyl groups per glucose unit of cellulose was dissolved in acetone to give a 15 percent solution. To this was added three parts of methacrylic anhydride in 30 parts of acetone. Five parts of finely powdered anhydrous sodium acetate was suspended in the mixture and the product heated at 60° C. for eight hours. A sample of the solution was removed, and the cellulose ester isolated and tested for solubility. It was soluble in chloroform, acetone and ethyl acetate. The solubility in chloroform proves the introduction of a significant proportion of methacrylate groups. The presence of methacrylate groups was further indicated by the fact that the ester could be polymerized to an insoluble product.

Example II

Cellulose acetate methacrylate

To 30 parts of a 15 percent solution in acetone of a cellulose acetate containing 2.4 combined acetyl groups per glucose unit there was added 3 parts of methacrylic anhydride and 3 parts of powdered, anhydrous sodium carbonate. The mixture was heated at 50° C. In about three hours, the reaction mixture had become quite stiff, due to formation of by-product salts. A small sample of the product was removed, washed well with alcohol, then with water and dried. It was freely soluble in chloroform, indicating an exceedingly fast reaction and high degree of methacrylation. Analysis of the product showed the presence of 0.25 methacrylate group.

The formation of a stiff gel from the by-product salts, resulting from reaction with sodium carbonate, is quite often characteristic of this method of esterification. The gel is easily broken down by the addition of a little water. If the solution is not too viscous, the insoluble salts can be settled out.

Example III

Cellulose acetate phthalate

Thirty parts of a 15 percent solution in acetone of a cellulose acetate containing 2.4 acetyl groups per glucose unit of cellulose was mixed with 3 parts of powdered sodium acetate and 5 parts of phthalic anhydride suspended in 15 parts of acetone. The mixture was heated at 60° C. for 16 hours after which the product was isolated from the acetone solution by precipitation with water, followed by washing with alcohol and drying. The mixed ester was very much softer than ordinary cellulose acetate when wet with water and could be dissolved readily in acetone containing a high proportion of water.

Example IV

Cellulose acetate benzoate

To 30 parts of a 15 percent acetone solution of a cellulose acetate containing 2.2 combined acetyl groups per glucose unit of cellulose there was added 5 parts of anhydrous sodium carbonate and 5 parts of benzoyl chloride. The mixture was tumbled at 20° C. for 20 hours to insure good mixing, after which it was placed in a 60° C. oven for five hours. The reaction mixture was quite fluid. The product was isolated by precipitation with water followed by washing with alcohol. It was very much more water repellent than the initial cellulose acetate and was readily soluble in chloroform, which shows that benzoylation had taken place.

Example V

Cellulose acetate methacrylate

Five hundred parts of a 15 percent solution in acetone of a cellulose acetate containing 2.2 combined acetyl groups per glucose unit of cellulose were mixed with 45 parts of sodium carbonate derived by heating sodium carbonate monohydrate at 125° C. for 24 hours. Forty-five parts of methacrylic anhydride was then stirred into the mass and the whole allowed to tumble at 45° C. In 40 minutes the whole mass had set to a stiff gel indicating reaction to have taken place. The mixture was allowed to stand for 24 hours at 25° C. before working up. A small quantity of water was added to the mass whereupon the solution liquefied and the insoluble salt settled out rapidly. The liquor containing the dissolved cellulose acetate methacrylate was decanted off and used directly for film casting.

Example VI

Cellulose acetate methacrylate

Five hundred parts of a 25 percent solution in acetone of a cellulose acetate of the type commonly used for spinning cellulose acetate yarn containing about 2.4 acetyl groups per glucose unit was mixed with 45 parts of methacrylic anhydride and 45 parts of sodium acetate. The mixture was tumbled for 20 hours at 45° C. The cellulose ester was then chloroform soluble, indicating that a considerable degree of methacrylation had taken place. The mixture was diluted with a little water and warmed to 60° C. to permit sodium acetate to settle out after which the solution was decanted from the settled salt and spun directly.

Example VII

Cellulose acetate isobutyrate

Thirty parts of a 15 percent solution in acetone of a cellulose acetate containing 2.2 combined acetyl groups per glucose unit of cellulose was mixed with a slurry composed of five parts of isobutyric anhydride, 5 parts of acetone and 5 parts of anhydrous sodium carbonate. The mixture was tumbled at 25° C. for sixteen hours. At the end of this period, the reaction mixture had set to a solid mass. A small sample removed from the mixture proved to be considerably more water repellent than the starting acetate and was found to be of excellent solubility in chloroform, indicating the introduction of a relatively high proportion of isobutyryl groups.

Example VIII

To 30 parts of a 15 percent solution in acetone of a cellulose acetate containing 2.2 combined acetyl groups per glucose unit of cellulose there was added 7 parts of an acid anhydride prepared from acids containing an average of 7.5 carbon atoms (produced by oxidation of higher alcohols prepared in the methanol synthesis), dissolved in an equal quantity of acetone. Addition of the mixture caused precipitation of the cellulose acetate. Five parts of anhydrous sodium carbonate were stirred in thoroughly and the whole mixture allowed to tumble at 25° C. After about an hour, the cellulose ester had again become soluble in the mixture, showing that a sufficient number of higher ester groups had already been introduced to make the product compatible with the mixture of acetone and higher anhydrides. The product was at that time also soluble in chloroform. After tumbling for 24 hours at 25° C., the product was isolated by precipitation with water and washing with alcohol. The product was very water repellent and of excellent solubility in chlorinated solvents indicating a significant degree of esterification with higher ester groups. In this and all of the examples where the materials are specified in parts, the parts are by weight.

While cellulose esters and particularly cellulose acetates are the preferred cellulose derivatives, the invention is not limited thereto but any other cellulose derivative which is soluble in organic solvents and which contains esterifiable hydroxyl groups, may be used, such as, for example, cellulose ethers, mixed cellulose esters or mixed cellulose ether esters, the essential requirement being that the cellulose derivatives shall be soluble in organic solvents and shall contain esterifiable hydroxyl groups.

As a solvent for the cellulose derivatives, there may be used any organic solvent which is substantially inert toward the esterifying agent. While organic solvents which contain no esterifiable groups are preferred, nevertheless, water and materials containing esterifiable radicals may be present in small amounts not exceeding ten percent of the total solvent without rendering the process inoperative. Wherever the term "organic solvent substantially inert toward the esterifying agent" is used in this specification and the appended claims, it means an organic solvent which has no esterifiable radicals and which contains not more than ten percent of water or materials containing esterifiable radicals. Acetone is preferred for the reactions of this invention in view of the wide range of cellulose esters which it dissolves, its inertness toward esterifying agents and catalysts of the group described, its volatility, ease of removal and low cost. Examples of solvents for cellulose acetate in addition to acetone are dioxan, ethyl acetate and methyl ethyl ketone. Examples of suitable solvents for ethyl cellulose are halogenated solvents such as chloroform and ethylene chloride and hydrocarbon solvents such as benzene and toluene.

As the esterifying agent, there may be used any organic esterifying agent for cellulose. Such, for example, as acid anhydrides or acid halides. However, the aliphatic acid anhydrides are the most satisfactory in the reaction and for this reason their use is preferred. The procedure is particularly adapted to the preparation of unsaturated esters of cellulose through the use of unsaturated esterifying agents derived from unsaturated acids such as methacrylic acid. It has been found that such ester groups are introduced into cellulose in this manner much more readily than by the use of prior art catalysts. Other representative esterifying agents comprise benzoyl chloride, butyric anhydride, valeric anhydride, lauric anhydride, lauric acid chloride, benzoic anhydride, methacrylic anhydride, etc. In the preferred form of the invention, the esterifying agent used is a material adapted to introduce an ester group different from those already present in the cellulose derivative molecule. The quantity of esterifying agent which is used depends primarily upon the number of ester groups which it is desired to introduce. For most efficient reaction, a quantity of esterifying agent is used which is no greater than that required to introduce the desired number of ester groups. In such instances, the reaction time is sometimes unduly prolonged. The reaction can be accelerated by the use of an excess of esterifying agent. Since it is difficult to remove such excess of the esterifying agent, such procedure is not in general recommended.

Any alkaline salt of the alkali or alkaline earth metals insoluble in the organic solvent employed may be used as a catalyst for the reaction. Examples of suitable catalysts include sodium carbonate, sodium phosphate, sodium acetate, sodium butyrate, sodium borate, etc. Sodium carbonate is the preferred catalyst above all others because of its outstanding activity in promoting the reaction. Further advantages of the use of sodium carbonate as a catalyst are its cheapness and the fact that it accelerates the reaction without providing a radical which takes part in the esterification itself. Salts of aliphatic acids, such as sodium acetate, always cause the introduction of a small proportion of ester groups derived from the anion of such salt. In many instances this is not a serious disadvantage and in some cases may even be desirable. Among the salts of the aliphatic acids, the alkali metal acetates are of greatest utility and are preferred to salts of higher acids. In general it may be said that in the most satisfactory embodiment of the invention, the alkaline salts used as catalysts are not soluble in the reaction mixture to an extent greater than 1% based on the total weight. It is then possible to remove the catalyst materials directly from the solution by filtration.

The amount of catalyst can be varied within wide limits. It is desirable that at least enough catalyst be present to react with the acid set free in the esterification. An excess of catalyst does no harm since it is easily removed after the reaction. The catalyst is preferably used in finely divided form in order that it may more effectively take part in the reaction. The reaction mixture is preferably agitated to maintain an intimate contact between the reactants and the catalyst. Agitation may be obtained by stirring, shaking or any other suitable method.

The reaction may be carried out over a wide range of temperatures. By way of illustration, it may be stated that the reaction is quite satisfactory from well below room temperature to as high as 150° C., pressure being applied when necessary. Inasmuch as the esterification is effected in the presence of an alkaline catalyst, degradation is minimized and high temperatures are not particularly harmful. In general, however, temperatures between 0° C. and 60° C. are preferred because under such temperature conditions it is not necessary to use pressure vessels in working with a low boiling solvent such as acetone and the reaction in most instances proceeds quite readily at these temperatures.

The time required for the reaction varies with the reactivity of the esterifying agent and the cellulose derivative, and must be regulated to suit the particular compounds involved. The concentration of the cellulose derivative is not important but should be sufficiently low to permit good mixing of reagents during the reaction. In general, concentrations up to 30 percent of the cellulose derivative are preferred. Above these concentrations, special mixing equipment is required.

The invention is particularly suited for the introduction of small proportions of ester groups into partially substituted cellulose derivatives, especially those which contain only a small proportion of esterifiable hydroxyl groups such as the acetone soluble cellulose acetates. Such small increases in degree of substitution involving a different ester group often exert a marked effect in physical characteristics, such as water repellancy, dyeing, etc. The introduction of a small proportion of butyryl groups into acetone soluble cellulose acetate, for example, renders shaped objects prepared from solutions of the product much more water resistant. The new process is of special utility for the modification of cellulose acetates which are to be spun into yarn, because the reaction can be effected directly upon the spinning mixture. Where such spinning mixtures contain water or alcohol, the reaction is not as efficient as in the absence of these substances, but due to the low proportion of water or alcohol usually present in spinning mixtures, their interference is not serious. Preferably, of course, the reaction is carried out in the absence of water or alcohol.

The principal advantages of the invention lie in the low cost of the catalyst and the simplified procedure which is involved. The prior art use of acid catalysts is characterized by a considerable degree of degradation which is avoided by the use of the alkaline salt catalyst of the present invention. The degradation produced by the use of acid catalysts is especially great in the production of esters containing high molecular weight groups, such as lauryl, oleyl, stearyl radicals, etc. In some instances, degradation with acid catalysts is sufficient to make derivatives prepared in their presence useless for the purpose of films, etc. In order to overcome these difficulties, the prior art has used organic bases such as pyridine. However, such organic bases are extremely difficult to remove from cellulose derivatives even by drastic purification processes. Organic base catalysts are undesirable in that they require expensive and difficult purification steps. The catalysts of the present invention are superior in that such purification is entirely avoided. Purification may either be omitted entirely, or merely consists of a simple filtration when the catalysts of the present invention are used. Inorganic caustic alkalis, such as sodium hydroxide, have been used in the prior art but these materials have a serious disadvantage in that they cause considerable saponification and loss of ester groups. The catalysts of the present invention avoid this difficulty because they are insoluble in the organic solvent and cause little or no saponification. The inorganic alkaline salts with which this invention is concerned are substantially free of the corresponding alkali metal or alkaline earth metal hydroxides. The process of the present invention has been found to be an especially desirable one because the cellulose derivatives are treated in solution and the materials are brought in intimate contact with each other, thereby giving uniform esterification; while at the same time the disadvantages which accompany the use of prior art catalysts are avoided.

Suitable changes may be made in the details of the process and any modifications or variations which conform to the spirit of the invention are intended to be included within the scope of the claims.

I claim:

1. A process of preparing mixed cellulose derivatives which comprises esterifying a cellulose derivative which is soluble in organic solvents and which contains esterifiable hydroxyl groups by dissolving the cellulose derivative in an organic solvent substantially inert toward the esterifying agent and treating the solution with an esterifying agent for cellulose in the presence of a catalyst of the group consisting of carbonates, phosphates, acetates, butyrates, and borates of the alkali and alkaline earth metals, said catalyst being present in at least sufficient quantity to react with the acid set free in the esterification.

2. A process of preparing mixed cellulose derivatives which comprises esterifying a cellulose derivative which is soluble in organic solvents and which contains esterifiable hydroxyl groups by dissolving the cellulose derivative in an organic solvent substantially inert toward the esterifying agent and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

3. A process of preparing mixed cellulose derivatives which comprises esterifying an acetone soluble cellulose derivative which contains esterifiable hydroxyl groups by dissolving the cellulose derivative in acetone and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

4. A process of preparing mixed cellulose derivatives which comprises esterifying an acetone soluble cellulose derivative which contains esterifiable hydroxyl groups by dissolving the cellulose derivative in acetone and treating the solution with an aliphatic acid anhydride while maintaining the solution in intimate contact with sodium carbonate, the sodium carbonate being present in at least sufficient quantity to react with the acid set free in the esterification.

5. A process of preparing mixed cellulose esters which comprises esterifying a cellulose ester which is soluble in organic solvents and which contains esterifiable hydroxyl groups by dissolving the cellulose ester in an organic solvent substantially inert toward the esterifying agent and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

6. A process of preparing mixed cellulose esters which comprises esterifying an acetone soluble cellulose ester which contains esterifiable hydroxyl groups by dissolving the cellulose ester in acetone and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

7. A process of preparing mixed cellulose esters which comprises esterifying an acetone soluble cellulose ester which contains esterifiable hydroxyl groups by dissolving the cellulose ester in acetone and treating the solution with an aliphatic acid anhydride while maintaining the solution in intimate contact with sodium carbonate, the sodium carbonate being present in at least sufficient quantity to react with the acid set free in the esterification.

8. A process of preparing mixed cellulose esters which comprises esterifying a cellulose ester which is soluble in organic solvents and which contains esterifiable hydroxyl groups by dissolving the cellulose ester in an organic solvent substantially inert toward the esterifying agent and treating the solution with methacrylic anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

9. A process of preparing mixed cellulose esters which comprises esterifying an acetone soluble cellulose ester which contains esterifiable hydroxyl groups by dissolving the cellulose ester in acetone and treating the solution with methacrylic anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

10. A process of preparing mixed cellulose esters which comprises esterifying an acetone soluble cellulose ester which contains esterifiable hydroxyl groups by dissolving the cellulose ester in acetone and treating the solution with methacrylic anhydride while maintaining the solution in intimate contact with sodium carbonate.

11. A process of preparing mixed cellulose esters which comprises esterifying a cellulose acetate which contains esterifiable hydroxyl groups by dissolving the cellulose acetate in an organic solvent substantially inert toward the esterifying agent and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

12. A process of preparing mixed cellulose esters which comprises esterifying a cellulose acetate which contains esterifiable hydroxyl groups by dissolving the cellulose acetate in acetone and treating the solution with an aliphatic acid anhydride while maintaining the solution in intimate contact with a catalyst of the group consisting of carbonates, phosphates, acetates, butyrates, and borates of the alkali and alkaline earth metals, said catalyst being present in at least sufficient quantity to react with the acid set free in the esterification.

13. A process of preparing mixed cellulose esters which comprises esterifying a cellulose acetate which contains esterifiable hydroxyl groups by dissolving the cellulose acetate in acetone and treating the solution with an aliphatic acid anhydride while maintaining the solution in intimate contact with sodium carbonate, the sodium carbonate being present in at least sufficient quantity to react with the acid set free in the esterification.

14. A process of preparing mixed cellulose esters which comprises esterifying a cellulose acetate which contains esterifiable hydroxyl groups by dissolving the cellulose acetate in acetone and treating the solution with methacrylic anhydride while maintaining the solution in intimate contact with sodium carbonate.

ROBERT W. MAXWELL.